US005390548A

United States Patent [19]
Kasper et al.

[11] Patent Number: 5,390,548
[45] Date of Patent: Feb. 21, 1995

[54] ELECTRODE ARRAY ELECTROMAGNETIC VELOCIMETER

[75] Inventors: Rolf F. Kasper, Old Lyme; Lee S. Langston, Manchester, both of Conn.

[73] Assignee: The United States of America as represented by the Secretary of the Navy, Washington, D.C.

[21] Appl. No.: 38,598

[22] Filed: Mar. 18, 1993

[51] Int. Cl.⁶ .............................................. G01F 1/58
[52] U.S. Cl. .............................. 73/861.15; 73/861.16
[58] Field of Search ............ 73/861.15, 861.16, 861.17

[56] References Cited

U.S. PATENT DOCUMENTS

| | | | |
|---|---|---|---|
| 3,898,881 | 9/1975 | Darby, Jr. | 73/861.15 X |
| 4,079,626 | 3/1978 | Gardner | 73/861.15 |
| 4,089,218 | 5/1978 | Cushing | 73/861.15 |
| 4,459,858 | 7/1984 | Marsh | 73/861.15 X |
| 4,483,190 | 11/1984 | Cornett | 324/179 X |
| 4,653,319 | 3/1987 | Parsonage | 73/861.15 X |
| 4,688,432 | 8/1987 | Marsh | 73/861.15 |
| 4,848,146 | 7/1989 | Bruno et al. | 73/861.15 X |

*Primary Examiner*—Richard E. Chilcot, Jr.
*Assistant Examiner*—Elizabeth L. Dougherty
*Attorney, Agent, or Firm*—Michael J. McGowan; Prithvi C. Lall; Michael F. Oglo

[57] ABSTRACT

A velocimeter for measuring the velocity field characteristics of a conductive fluid moving over a surface is provided. A magnet has a central axis that is aligned with a direction of fluid movement of interest such that a plurality of magnetic flux lines extend generally normal from the surface. A plurality of electrode pairs provide electrical output signals that are proportional to variations in the magnetic flux lines as the conductive fluid flows therethrough in accordance with Lorentz forces. Each electrode pair is disposed symmetrically about the central axis of the magnet. The plurality of electrodes are mounted in a fixed relation with the magnet. The electrical output signals from the electrode pairs are processed and displayed as the velocity field characteristics of the fluid in the direction of interest.

8 Claims, 6 Drawing Sheets

ELECTRODE ARRAY ELECTROMAGNETIC VELOCIMETER

ELECTRODE ARRAY ELECTROMAGNETIC VELOCIMETER STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION

1. Field of the Invention

The present invention relates generally to velocimeters, and more particularly to an electrode array electromagnetic velocimeter that measures the velocity distribution characteristics of a liquid as it flows over a solid surface. The invention can be used as a general purpose velocimeter in conjunction with a conductive liquid.

2. Description of the Prior Art

There are many situations that arise in military, industrial, and commercial enterprises in which it is important to be able to measure the velocity of a liquid. Over the years, a variety of methodologies have been utilized to solve this problem. For instance, one of the first accurate methods, called the "salt velocity" method, involves introducing a quantity of salt into the flow and detecting its movement past two spaced points in the flow using electrical sensors. However, this method is limited to controlled situations.

Another common method for measuring fluid velocity uses a pressure probe known as a "pitot tube" in which the static and total pressures at a point are measured. The fluid velocity is calculated from Bernoulli's equation or from a calibration curve, using the difference between the total and the static pressures, which difference represents the kinetic or velocity energy. The drawbacks associated with the use of such a pressure probe are that the probe is intrusive on the velocity field itself, is dependent on fluid properties, and provides only an indirect measurement of velocity.

Another form of velocimeter involves the use of a hot wire or film, but such a device can also effect the velocity by its very presence. It provides a very indirect measurement of velocity, since heat transfer from the hot wire is measured and the velocity is calculated by means of an experimental correlation, which correlation is dependent on fluid property variables.

The laser doppler velocimeter provides yet another means of fluid velocity measurement by use of the frequency shift of reflected laser light from solid particles in the flow field. However, because of the size of the apparatus, it is usually limited to a laboratory situations. Another constraint imposed by the use of the laser system is that the fluid must be transparent to the laser light and that the solid particles must be small enough to accurately follow fluid streamlines.

It has been recognized for some time that a non-obtrusive velocimeter can be constructed using electromagnetic (EM) principles if the fluid is an appropriate electrical conductor. The velocity field of such a fluid can be found by imposing a suitable magnetic fluid on the flow and then measuring the resulting induced voltage between two electrodes placed in the fluid or on a solid insulated surface in contact with the fluid. Such an electromagnetic velocimeter provides a direct measure of the velocity field. It is "direct" in the sense that a basic law (Faraday's Law) is used to measure the velocity field, rather than relying on empirical correlations. This velocity field measurement is completely independent of the usual fluid properties (e.g., viscosity). The magnetic field will not distort the velocity field, so long as the magnetic Reynolds number is kept small. This would be the case with seawater, for instance, but not with a liquid metal, such as mercury.

One difficulty in using an electromagnetic velocimeter is in obtaining an explicit expression for velocity at a point. This can be seen from the so-called "flow meter" equation, known as the Shercliff-Bevir equation, which was given by J. Bevir and published in "Journal of Fluid Mechanics" Volume 43, 1970, at page 577. This equation gives velocity explicitly as:

$$\Delta\phi = \int_v V \cdot W dv \qquad (1)$$

where $\Delta\phi$ is the induced voltage difference between two electrodes, v is the volume of integration in the fluid, V is the fluid velocity vector in terms of dv, and W is the weight vector (the fluid meter geometry factor) given by $$W = B \times J_v \qquad (2)$$

where B is the magnetic field flux density vector and $J_v$ is the virtual current vector as defined by Bevir. The induced voltage $\Delta\phi$ in Equation (1) is the output voltage signal of the electromagnetic velocimeter and is implicitly related to the fluid velocity field through the integral in Equation (1).

In U.S. Pat. No. 4,484,146 issued to Bruno et al., an electromagnetic velocimeter was presented that takes into account the matter of induced currents and end effects. However, this patent has only two pair of parallel line electrodes, each mounted orthogonal to the other. Thus, if fluid motion is in a direction normal to one pair, the other pair (parallel to the fluid motion) will provide the only voltage output $\Delta\phi$ for the velocimeter. By Faraday's Law, the normal pair will give no signal. Thus, from Equation (1), it can be seen that it would be difficult to obtain detail explicit information about the fluid velocity, based on only a single value of $\Delta\phi$. Although several of these velocimeters disclosed by Bruno et al. can be used at the same time, each would have a different volume over which the velocity vector V in Equation (1) would be measured.

SUMMARY OF THE INVENTION

Accordingly, it is an object of the present invention to provide a velocimeter for providing for the accurate measurement of the velocity field in a conductive fluid.

It is a further object of the present invention to provide an electromagnetic velocimeter that explicitly measures the velocity field associated with a conductive fluid flow in accordance with the Shercliff-Bevir equation.

Other objects and advantages of the present invention will become more obvious hereinafter in the specification and drawings.

In accordance with the present invention, a velocimeter for measuring the velocity profile characteristics of a conductive fluid moving over a surface of a solid member is provided. A magnetic field generating means has a central axis aligned with a direction of fluid movement of interest. The magnetic field generating means produces a plurality of magnetic flux lines extending generally normal from the surface of the solid member. A plurality of electrode pairs are disposed within the magnetic field generating means to provide electrical output signals that are proportional to variations in the magnetic flux lines as the conductive fluid flows therethrough. The variations are produced by Lorentz forces. Each electrode pair is disposed symmetrically about the central axis of the magnetic field generating means. Insulation surrounds and embeds the magnetic field generating means and the plurality of electrode pairs within a main body. Electric signal processing means process the electrical output signals from the plurality of electrode pairs and provide same to a display.

BRIEF DESCRIPTION OF THE DRAWINGS

Other objects, features and advantages of the present invention will become apparent upon reference to the following description of the preferred embodiments and to the drawings, wherein.

DESCRIPTION OF THE PREFERRED EMBODIMENT

Figure 1:
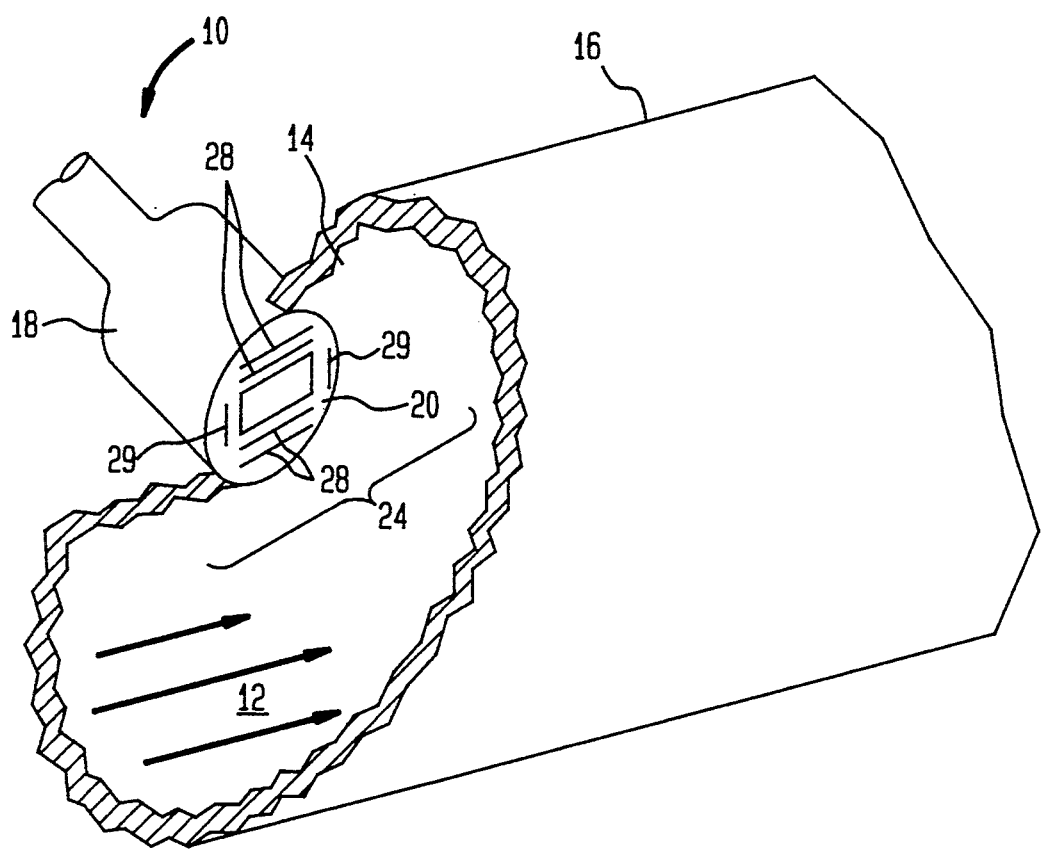
FIG. 1 is a perspective view of a velocimeter incorporating the principles of the present invention as it would be used to measure the velocity field of a fluid flow in a conduit.

Referring now to the drawings, and more particularly to FIG. 1, a velocimeter 10 is shown mounted in the flow field of a conductive fluid 12 moving over a surface 14 of a solid member 16 in the direction of the flow arrows. Velocimeter 10 is provided with a generally tubular main body 18 having a generally cylindrical face 20 that is flush with the surface 14. In the preferred embodiment, the solid member 16 is a conduit and face 20 is shaped to conform to the concave shape of inner surface 14 of the conduit such that conductive fluid 12 is tangential to face 20. The velocimeter can also be placed on a flat surface immersed in the fluid flow, or could be located on the exterior surface of a body immersed in the flow as long as the face of the velocimeter is parallel with the nominal direction of fluid flow.

Figure 2:
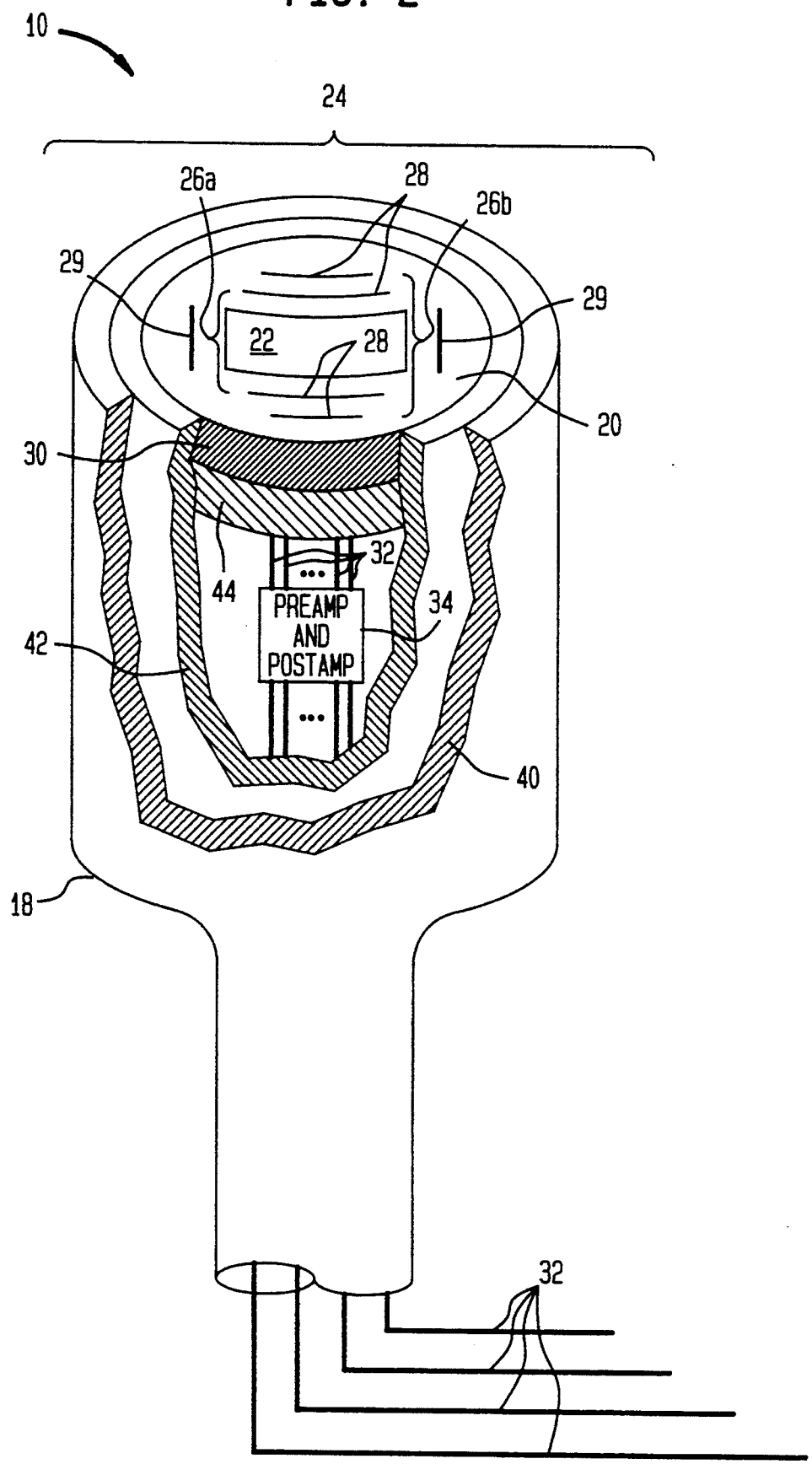
FIG. 2 is a cut-away perspective view of the velocimeter in isolation.
Figure 3:
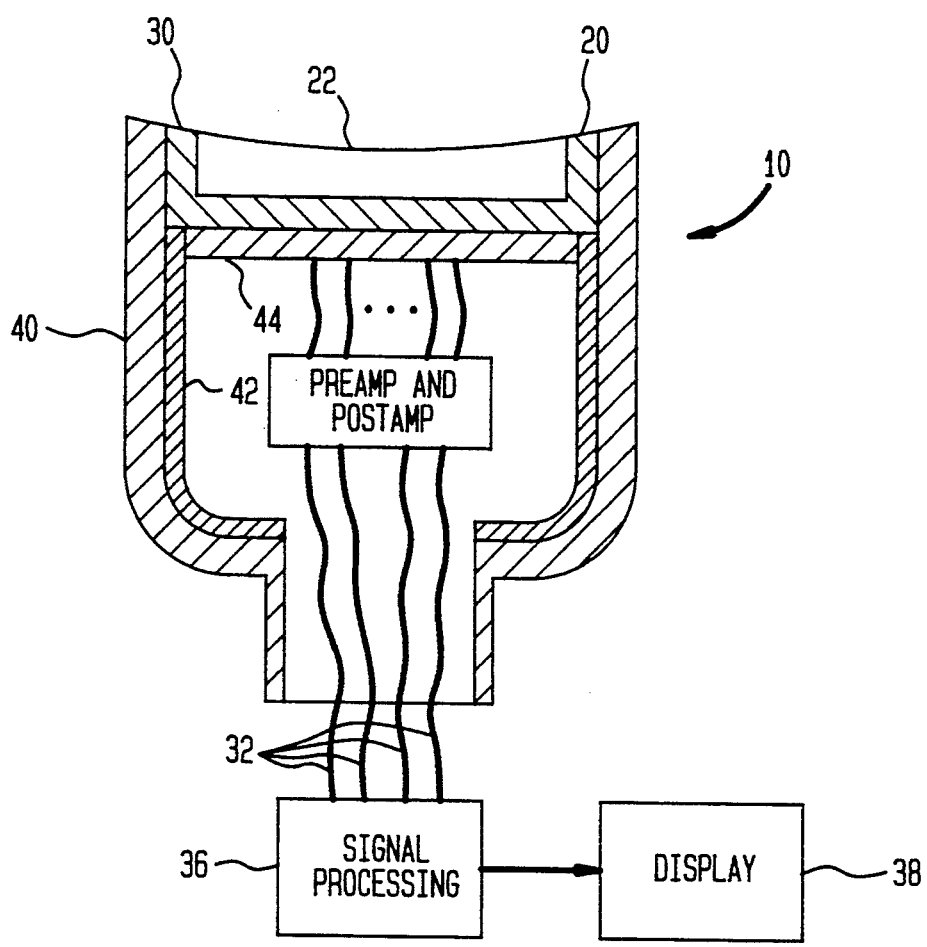
FIG. 3 is a cross-sectional side view of the velocimeter according to the present invention.

FIGS. 2 and 3 show the construction of the preferred embodiment velocimeter 10 in greater detail. Specifically, FIG. 2 is a cut-away perspective view of velocimeter 10 and FIG. 3 is a cross-sectional side view thereof. Like reference numerals will be used for common elements. Velocimeter 10 includes a magnetic field generating means 22 that is, in the preferred embodiment, a permanent magnet mounted flush with face 20. A permanent or DC field magnet is useful for measuring turbulent flow characteristics. Alternatively, an electromagnetic coil or AC field magnet could be used in place of the permanent magnet when it is desired to measure laminar flow characteristics. Magnet 22 produces a plurality of magnetic flux lines (not shown) that extend generally normal to the conduit's surface 14.

An electric field sensing means 24 is mounted in the main body 18 in an arrangement that is coaxial with and disposed within the magnetic field generated by magnet 22. Sensing means 24 measures the electric field produced as a result of the interaction between the magnetic field and the conductive fluid flowing therethrough. This interaction is well known as the Lorentz force. As a result, the electrical output signals generated by sensing means 24 are proportional to variations in the fluid's velocity field. Sensing means 24 includes sets 26a and 26b of closely-spaced, parallel electrodes 28. While only two sets are shown for ease of illustration, it is to be understood that the present invention may include a plurality (greater than 2) of sets. The electrodes 28 are elongated strips of flat-plate metal foil or cylindrical wires, either of which is suitable. Electrodes 28 are typically aligned with the direction of fluid movement as shown, and are flush with the face 20 of the main body. Alternatively, the electrodes can be set at a non-zero angle with respect to the fluid flow to measure an appropriate component of the velocity field. A set of transverse electrodes 29 are also shown located flush with face 20 for the purpose of measuring such velocity component characteristics. In addition, the electrodes might be arranged in a three-dimensional configuration.

A body of insulation 30 surrounds and embeds magnet 22 and the electrical field sensing means 24. Each electrode 28 is connected by leads 32 to preamp and postamp electronics 34 and then to an electrical signal processing means 36 that processes electrical output signals from electrodes 28 to generate signals indicative of the fluid velocity field for viewing on an appropriate display 38. The physical construction of velocimeter 10 further includes an outer shell 40 made of a high conductivity metal to provide magnetic shielding. A lining 42 formed of rigid plastic is located along the inner surface of the shell 40. Further, a support bed 44 made of rigid plastic may also be provided beneath insulation 30. In this way, preamp and postamp electronics 34 may be enclosed within the cavity formed between lining 42 and support bed 44. the operation and the advantages of the present invention will now be readily understood in view of the above description. The electromagnetic velocimeter of the present invention is a multiple paired electrode apparatus obtained by forming an array of paired electrodes with a specified spacing. It will measure laminar or turbulent flow in an electrically-conductive fluid at a low magnetic Reynolds number. Further, measurements can be made on flows that are either steady or time varying. The basis for the operation is the Shercliff-Bevir Equation (1) noted above. This equation is used extensively in the design of commercial volume flow meters for pipe flow and its technical maturity is well established for contained fluid conditions.

Figure 4:
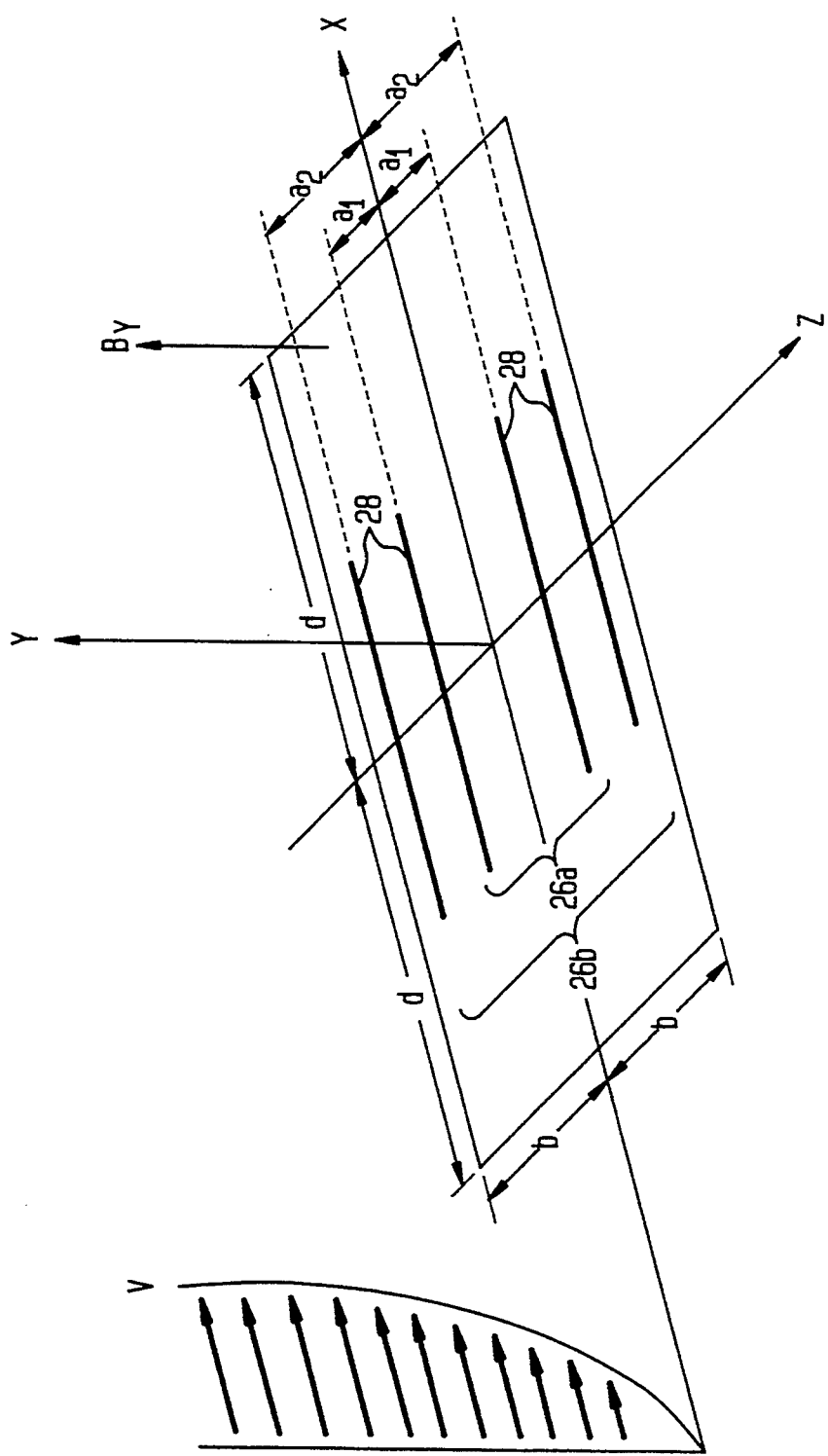
FIG. 4 is a schematic view showing the fundamental dimensions used in the present invention for two pair of flat electrodes in a boundary layer fluid flow over a flat plate.

FIG. 4 illustrates the fundamental design dimensions for the electrode pairs 26a and 26b, and magnetic field components. For ease of illustration, it will be assumed that a flat surface construction is being considered (as opposed to the concave construction described above).

The electromagnetic velocimeter using a magnet whose magnetic flux density ($B_y$ field vectors) are as shown with respect to the direction of the velocity vector V (x-direction). The magnetic field dimensions are $2b$ wide and $2d$ long for a rectangular magnet, but the magnet could be shaped otherwise, e.g., a circle. The electrodes necessary to measure the output voltage (given by Equation (1)) are arranged in n pairs, where n is greater than 1 (n=2 for the instant case). Each pair is centered with respect to the magnetic field and is typically parallel to the main fluid flow direction. The electrodes 28 can be all of equal length and each pair is spaced $2a_i$ apart. For example, electrodes 28 forming pair 26a are spaced $2a_1$ apart and electrodes 28 forming pair 26b are spaced $2a_2$ apart. In general, the i-th pair would be spaced $2a_i$ apart. Each induced voltage $\Delta\phi$ between an associated electrodes can be measured and recorded by suitable instrumentation. This voltage can be steady-state (steady laminar flow), time-dependent (turbulent flow), or can be time-averaged to get a mean value.

As an example of the operation of the multiple paired electrode array electromagnetic velocimeter, consider the case of a two-dimensional boundary whose layer thickness $\delta$ is assumed to be nearly constant over the velocimeter in the x and z directions, and whose fluid flow direction is parallel to the electrodes in the array (i.e., the x-direction). By assuming a boundary layer velocity profile (V in Equation (1)), a constant value of $B_y$ for the magnetic flux, and modeling the electrodes as source-sink lines of known length (to get $J_y$ in Equation (2)), Equation (1) can be integrated to get values of $\Delta\phi$ as a function of the electrode spacing in the array.

Figure 5:
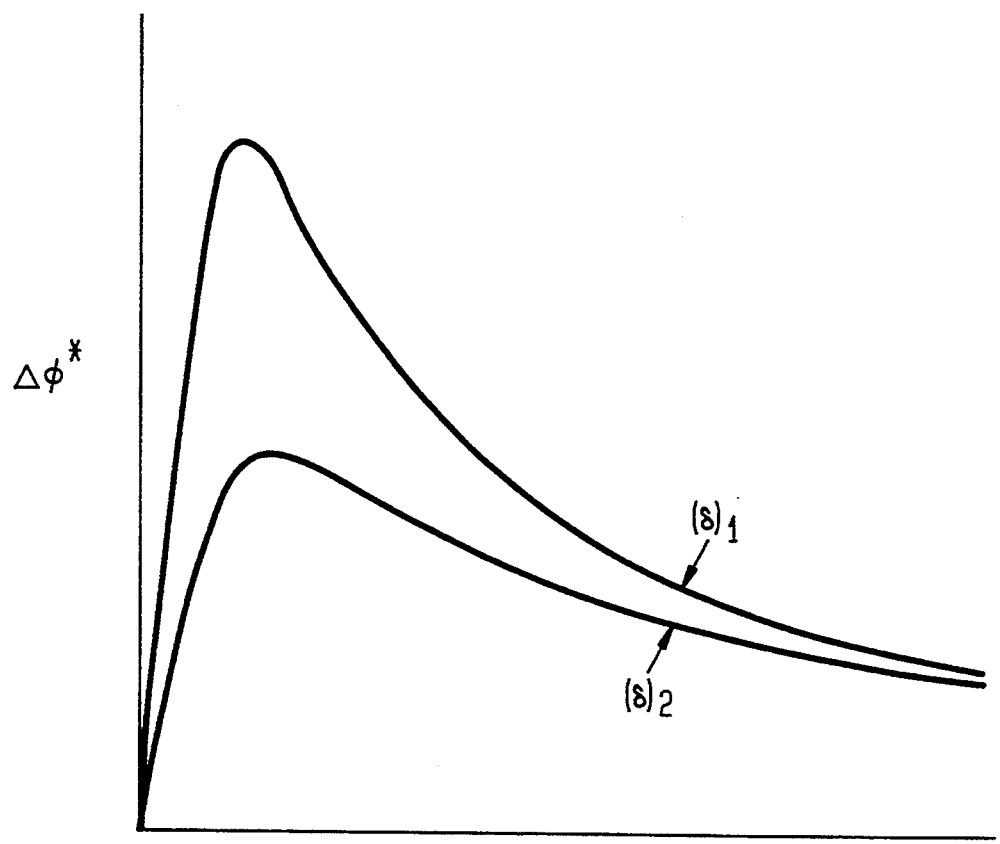
FIG. 5 is a plot of the non-dimensional induced voltage $\Delta\phi^*$ as a function of (spacing half width/magnet half width) for two different boundary layer thicknesses or two different boundary layer shape factors.

FIG. 5 shows a plot of a non-dimensional voltage output $\Delta\phi^*$, where $\Delta\phi^*$ is equal to $\Delta\phi_i/\Delta\phi_{uniform}$ and $\Delta\phi_{uniform}$ is the voltage reading for uniform flow (i.e., $\delta=0$), as a function of $a_i/b$, (where b is the magnet half width and $a_i$ is the half spacing of the i-th electrode pair). Each of the two curves in FIG. 5, derived from Equation (1), represent a different boundary layer thickness $(\delta)_1$ and $(\delta)_2$. For the two pair of electrodes used, it can be seen that the arrayed pairs clearly define the curve shape for a given boundary layer thickness.

The two curves in FIG. 5 could also represent two boundary layers with the same thickness $\delta$, but having two different shape factor values. The shape factor H is the ratio of the displacement thickness to the momentum thickness. The upper curve in FIG. 5 would represent the boundary layer with the lower value of shape factor. Clearly, the voltage outputs from the multiple array allow one to measure and differentiate boundary layer shapes.

Figure 6A:
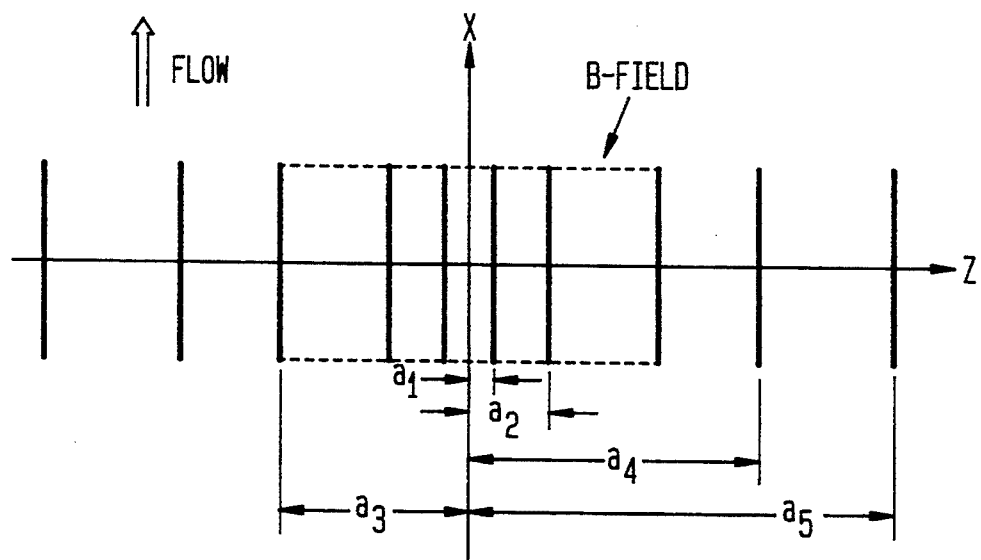
FIG. 6A is a top view of another embodiment of the present invention showing a magnet and five pairs of electrodes.
Figure 6B:
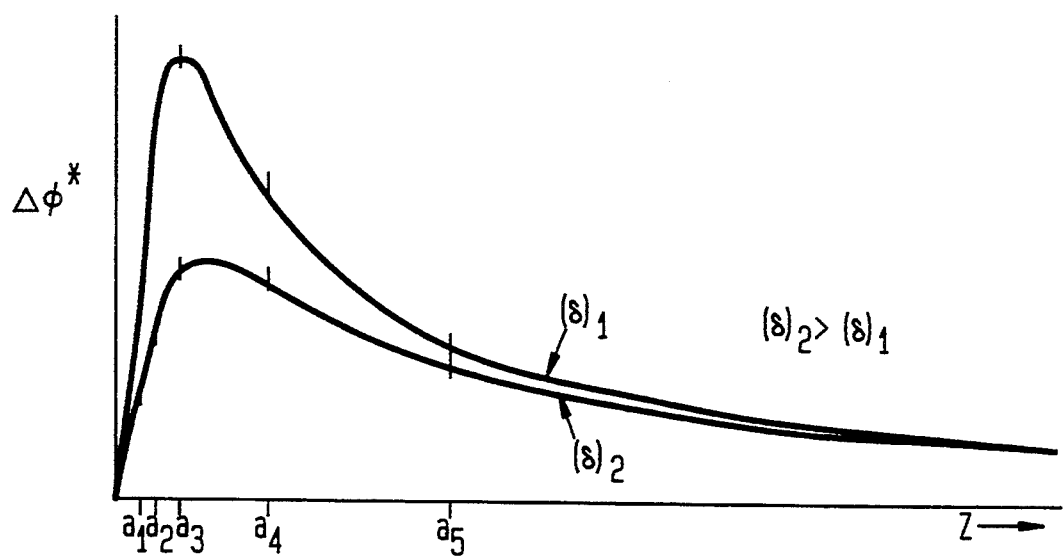
FIG. 6B is a plot of the non-dimensional induced voltage $\Delta\phi^*$ as a function of spanwise distance z for two different boundary layer thicknesses.

Another example layout for a magnet and five pair of electrodes is shown in the top view of FIG. 6A where electrode pairs are spaced apart $2a_1$, $2a_2$, etc. The voltage readings from the five pairs of electrodes would produce the $\Delta\phi^*$ vs. z curves as shown in FIG. 6B for two boundary layer thicknesses, $(\delta)_1$ and $(\delta)_2$, where $(\delta)_2 > (\delta)_1$. The coordinate Z is the spanwise direction as shown in FIG. 6A.

The advantages of the invention will be clear from the above description. The measurements of fluid flow velocity characteristics may be obtained nonobtrusively when the magnetic Reynolds number is small. The apparatus can be calibrated to accept a wide variety of fluid flows. Calibration is easily accomplished since velocity is always given by Faraday's Law. By using an array of pairs of parallel electrodes, more than one output voltage is measured at the same time with the installation of a single device. The multiple array of electrode pairs allows one to measure the boundary layer velocity profile characteristics, thus partially bypassing the implicit nature of the governing Shercliff-Bevir relationship.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A velocimeter for measuring boundary layer velocity volume integrals in a conductive fluid moving over a surface of a solid member, comprising:

a main body having a face that is mounted flush with the surface of the solid member;

magnetic field generating means mounted in said main body for producing a plurality of magnetic flux lines extending generally normal from the surface of the solid member;

electric field sensing means mounted in said main body and disposed within said plurality of magnetic flux lines for providing electrical output signals that are proportional to variations in said plurality of magnetic flux lines as the conductive fluid flows therethrough, said electric field sensing means including a plurality of parallel electrodes flush with said face of said main body, each of said plurality of parallel electrodes aligned parallel with a direction of movement of the conductive fluid, said plurality of parallel electrodes further defined by N nested sets, $N \geq 2$, of two parallel electrodes with unique spacing therebetween, each of said N nested sets centered in said plurality of magnetic flux lines;

insulation surrounding and embedding said magnetic field generating means and said electric field sensing means, and further contained within said main body; and means conductively attached to said electrical field sensing means for processing the electrical output signals from said sensing means and for providing readouts of the velocity field.

2. A velocimeter as in claim 1, wherein the solid member is a conduit, and wherein said face of said main body is formed to conform to the inner surface of the conduit.

3. A velocimeter as in claim 1, wherein said magnetic field generating means comprises a permanent magnet embedded in said insulation with one face flush with said face of said main body.

4. A velocimeter for measuring boundary layer velocity volume integrals in a conductive fluid moving over a surface of a solid member, comprising:

magnetic field generating means having a central axis that is aligned with a direction of fluid movement of interest, said magnetic field generating means producing a plurality of magnetic flux lines extending generally normal from the surface of the solid member;

N pairs of electrodes, $N \geq 2$, disposed within said plurality of magnetic flux lines for providing electrical output signals that are proportional to variations in said plurality of magnetic flux lines as the conductive fluid flows therethrough, said variations being produced by Lorentz forces, each n-th pair of electrodes, n=1 to N, being disposed parallel to and symmetrically about the central axis of said magnetic field generating means to define a unique spacing $2a_n$ between electrodes of said n-th pair of electrodes wherein $a_n$ is the distance from the central axis of said magnetic field generating means to each electrode of said n-th pair of electrodes, each said n-th pair of electrodes aligned with the direction of fluid movement of interest;

means for mounting said N pairs of electrodes in a fixed relation to said magnetic field generating means; and means conductively attached to said N pairs of electrodes for processing the electrical output signals therefrom and for displaying the velocity field of the fluid in the direction of interest.

5. A velocimeter as in claim 4 further comprising at least one pair of transverse electrodes disposed parallel to one another and transverse to the central axis of said magnetic field generating means for providing electrical output signals that are proportional to variations in said magnetic flux lines due to fluid movement in a direction transverse to the direction of fluid movement of interest.

6. A velocimeter as in claim 4 wherein said magnetic field generating means comprises a permanent magnet.

7. A velocimeter as in claim 4 wherein said magnetic field generating means and said N pairs of electrodes lie in a common planar surface that is disposed tangentially to and parallel with the conductive fluid moving over the surface.

8. A velocimeter as in claim 4 wherein said magnetic field generating means and said N pairs of electrodes lie in a common planar surface that is immersed in and parallel with the conductive fluid moving over the surface.

* * * * *